US009480277B2

(12) United States Patent
Giuseppin et al.

(10) Patent No.: US 9,480,277 B2
(45) Date of Patent: Nov. 1, 2016

(54) METHOD FOR PREPARING FOOD PRODUCT

(75) Inventors: Marco Luigi Federico Giuseppin, Gieten (NL); Robin Eric Jacobus Spelbrink, Groningen (NL)

(73) Assignee: COOPERATIC AVEBE U.A., Veendam (NL)

( * ) Notice: Subject to any disclaimer, the term of this patent is extended or adjusted under 35 U.S.C. 154(b) by 0 days.

(21) Appl. No.: 12/741,450

(22) PCT Filed: Nov. 5, 2008

(86) PCT No.: PCT/NL2008/050697
§ 371 (c)(1),
(2), (4) Date: Jun. 7, 2010

(87) PCT Pub. No.: WO2009/061186
PCT Pub. Date: May 14, 2009

(65) Prior Publication Data
US 2010/0247710 A1  Sep. 30, 2010

(30) Foreign Application Priority Data

Nov. 7, 2007  (EP) .................................... 07120182

(51) Int. Cl.
*A21D 2/26* (2006.01)
*C07K 14/415* (2006.01)
*C12N 9/02* (2006.01)
*A21D 8/04* (2006.01)
*A21D 2/36* (2006.01)
*A23L 1/035* (2006.01)

(52) U.S. Cl.
CPC ............... *A23L 1/035* (2013.01); *A21D 2/264* (2013.01); *A21D 2/366* (2013.01); *A21D 8/042* (2013.01)

(58) Field of Classification Search
CPC .... A01B 12/006; A21D 2/264; A21D 2/366; A21D 8/042
USPC ........................................................... 426/20
See application file for complete search history.

(56) References Cited

FOREIGN PATENT DOCUMENTS

| NO | 0 487 480 | * | 5/1992 | ............. C07K 15/10 |
| WO | WO9742834 | * | 11/1997 | ................ A23J 1/16 |

OTHER PUBLICATIONS

RU-426640—English Abstract—pp. 3-4.*
Shimizu, T. et al. 1984. Enzyme with dual lipoxygenase activities catalyzes leukotriene A4 synthesis from arachidonic acid. Proc. Natl. Acad. Sci. 81: 689-693.*
SU 426640-1972—Use of potato lipoxygenase in baking. English Abstract.*
Shimizu, T. et al. Proc. Natl. Acad. Sci. 81: 689-693 (1984).*
van Koningsveld, G. A. et al. J. Agric. Food Chem. 49: 4889-4897 (2001).*

(Continued)

*Primary Examiner* — Hamid R Badr
(74) *Attorney, Agent, or Firm* — Hoffmann & Baron, LLP

(57) ABSTRACT

The invention is directed to a method for preparing a fermented dough based food product, to a fermented dough based food product, to the use of native potato protein isolate, to a bread improver, and to a dough. The method of the invention comprises preparing a dough which dough comprises which dough comprises a native potato protein isolate, said native potato protein isolate having a protein content of 90% or more based on dry matter as determined from the weight of total Kjeldahl nitrogen multiplied by 6.25. The invention is also directed to a fermented dough based food product obtainable by said method.

24 Claims, 5 Drawing Sheets

(56) References Cited

OTHER PUBLICATIONS

T. Fukui, "Addition of Potato Protein Recovered from Potato Starch Factory Waste Effluents for Bread", Abstract, Online, retrieved from the Internet: URL: http://mdl.csa.com/partners/viewrecord.php?requester=gs&collection=ENV&recid=7901073&q=potato+bread+protein+author:fukui&uid=&setcookie=yes>; 2009.

Gerrit A. van Koningsveld et al., "Effects of pH and Heat Treatments on the Structure and Solubility of Potato Proteins in Different Preparations", Journal of Agricultural and Food Chemistry, vol. 49, No. 10, pp. 4889-4897; 2001.

Ambroziak et al., "The Use of Potato Products as Bread Quality Improvers", Acta Alimentaria Polonica, vol. 12, No. 2, pp. 83-90; 1986.

Pourveau et al., "Relative Abundance and Inhibitory Distribution of Protease Inhibitors in Potato Juice from cv. Elkana", Journal of Agricultural and Food Chemistry, vol. 49, pp. 2864-2874; 2001.

T. Fukui, "Additional of Potato Protein Recovered from Potato Starch Factory Waste Effluents for Bread," May 20, 1977 (Fukui report from the Junior College of Ubc) (Yamaguchi-ken, Japan).

* cited by examiner

Figure 1: Proteolytic activity in dough
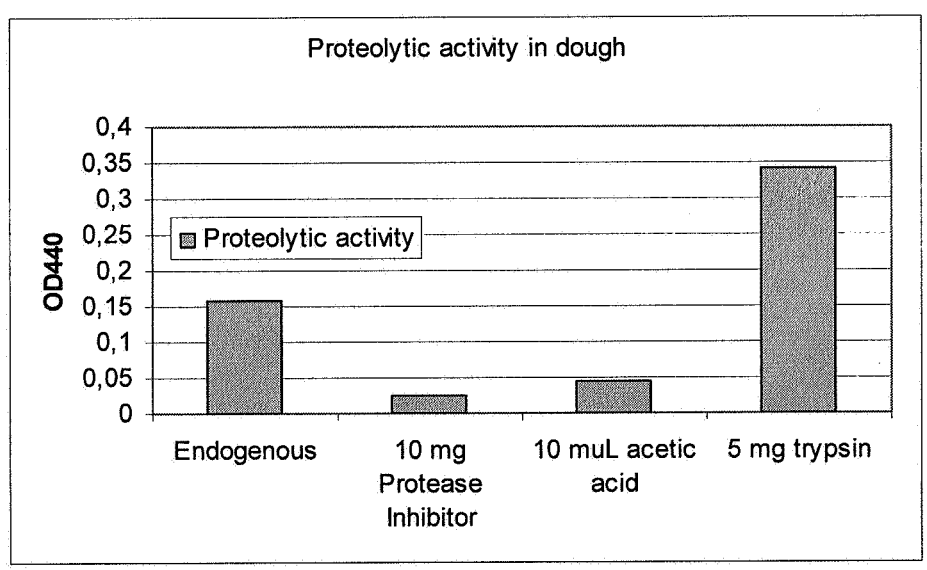

METHOD FOR PREPARING FOOD PRODUCT

This application is the U.S. National Phase of, and Applicants claim priority from, International Application Number PCT/NL2008/050697 filed 5 Nov. 2008 and European Patent Application Number 07120182.6 filed 7 Nov. 2007, each of which are incorporated herein by reference.

BACKGROUND OF THE INVENTION

The invention is directed to a method for preparing food product, to a food product, to the use of native potato protein isolate, to a bread improver, and to a dough.

Many food processes are impaired by undesirable and uncontrolled prolonged action of proteases during proofing. The proteases can be endogenous to ingredients in the food product or can be provided by the addition of micro-organisms and/or enzyme preparations.

The prolonged action of proteases is in particular undesirable in food products that are based on dough comprising a leavening agent, such as bread. Proteases can for instance be included in food products based on dough comprising a leavening agent to increase the workability of the dough.

Dough handling and/or dough stability is impaired by the action of proteases during long proofing times. In the proofing process a leavening agent is allowed to leaven the dough (i.e. to lighten the texture and/or to increase the volume). The leavening agent can for example be yeast. The leavening process is much faster when chemical leavening agents are used, such as baking powder, baking soda (also known as sodium bicarbonate), ammonium bicarbonate (also known as hartshorn, horn salt, bakers ammonia), potassium bicarbonate (also known as potash), potassium bitartrate (also known as cream of tartar), potassium carbonate (also known as pearlash), and monocalcium phosphate. In sourdough breads, the flavour is further enhanced by various lactic or acetic acid bacteria.

Gluten is a combination of proteins that forms a large network during dough formation. This network holds the gas in during dough proofing and baking. The strength of this gluten protein network is therefore extremely important for products based on fermented dough or dough using its endogenous proteases. Proteases break down the gluten protein network during proofing. This leads to weak, non-elastic dough and a poor gas holding capacity and relatively low bread volume.

The effect of prolonged activity of proteases on for example the gluten structure can at least partly be countered by adding oxidative enzymes which are capable of cross-linking and strengthen the gluten protein network. No suitable protease inhibitors are available to sufficiently inhibit the action of many types of endogenous flour endoproteases and aminopeptidases. These various proteases have broad ranges of substrate specificities. This makes it difficult to inhibit with a single type of protease inhibitor. The protease inhibitor must be sufficiently unstable. During baking the protease inhibitor must be inactivated to a large extent to avoid unwanted high levels of inhibitor activity such as trypsin inhibitor that may interfere with the digestion of proteins.

Ambroziak et al. (*Acta Alimentaria Polonica* 1986, Vol. XII(XXXVI), No. 2, 83-90) describe the use of potato products as bread quality improvers. They mention that enzymatically active potato juice can increase the volume of bread and improves crumb properties. However, it cannot be derived from this document which components of the potato juice are responsible for the improvements of the bread quality. Moreover, potato juice comprises undesirable components, such as negatively charged polymers, pectins, glycoalkaloids, and micro-organisms. These components can give rise to a negative off-taste and/or colour formation.

Object of the invention is to at least partly overcome these shortcomings in the prior art.

Further object of the invention is to provide a fermented dough based food product, with improved water holding capacity and/or elasticity.

Yet a further object of the invention is to provide a suitable replacement for commonly used oxidative agents, which require product labelling.

DESCRIPTION OF THE INVENTION

The inventors surprisingly found that one or more of these objects can be met by using concentrated native potato protein isolates in the preparation of food products based on fermented dough. It was found that potato protein isolates are capable of significantly improving the quality of such food products.

Accordingly, in a first aspect the invention is directed to a method for preparing a food product based on dough comprising a leavening agent, comprising preparing a dough which dough comprises a native potato protein isolate, said native potato protein isolate having a protein content of 90% or more based on dry matter (weight of total Kjeldahl nitrogen multiplied by 6.25).

FIG. 1 shows the proteolytic activity in dough of various samples.

Figure 2A:
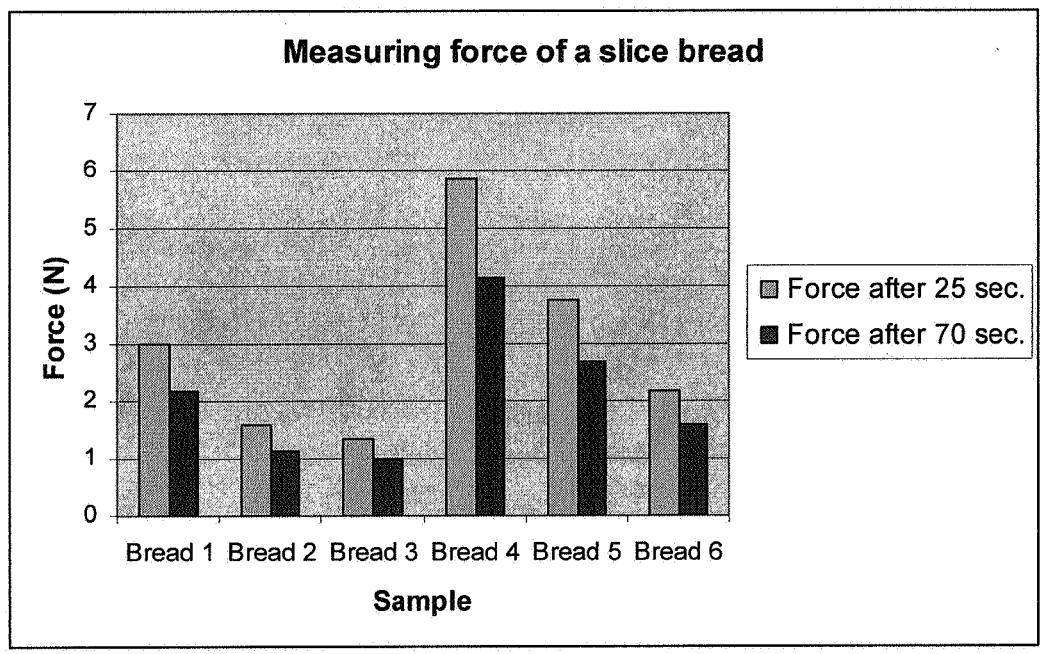
FIG. 2A shows the measuring force of a slice of bread of different examples.

The term "native potato protein" as used in this application is meant to refer to the potato protein without any significant physical or (bio)chemical modification or inactivation, in particular denaturation.

The term "leavening agent" as used in this application is meant to refer to an agent that is used to lighten the texture and/or increase the volume of baked goods. When mixed with a liquid the leavening agent can form carbon dioxide gas bubbles, which cause a batter or dough to rise during (and sometimes before) the baking process. Suitable leavening agents include yeast, baking powder, baking soda, ammonium bicarbonate, potassium bicarbonate, potassium bitartrate, potassium carbonate, and monocalcium phosphate.

Native potato proteins can tentatively be divided into the following three classes: (i) the patatin family, highly homologous acidic 43 kDa glycoproteins (40-50 wt. % of the potato proteins), (ii) basic 5-25 kDa protease inhibitors (30-40 wt. % of the potato proteins) and (iii) other proteins mostly high molecular weight proteins (10-20 wt. % of the potato proteins) (Pots et al., *J. Sci. Food. Agric.* 1999, 79, 1557-1564).

Patatin is a family of glycoproteins that have lipid acyl hydrolase and transferase activities and accounts for up to 40 wt. % of the total soluble protein in potato tubers. The patatin isolate of native potato protein comprises oxidases and lipase.

Protease inhibitors can be divided into different groups based on their molecular weight. The different groups of protease inhibitors are identified as protease inhibitor I (molecular weight of about 39 kDa), carboxypeptidase inhibitor (molecular weight of about 4 100 Da), protease inhibitors IIa and IIb (molecular weight of about 20.7 kDa), and protease inhibitor A5 (molecular weight of about 26 kDa). The ratio of these different groups of protease inhibitors in the total potato protein depends on the potato variety.

Surprisingly, it was found that native potato protein isolate can be used to remarkably improve the properties of a food product based on dough comprising a leavening agent.

The native isolate of potato protease inhibitors is capable of effectively inactivating endogenous and microbial proteases in dough, at least to a large extent, and preferably essentially completely. It was found that inactivation by native potato protease inhibitor isolate results in firm dough, while other methods of inactivation are not available. Furthermore, the native isolate of potato protease inhibitors strengthen the dough by virtue of reduced gluten protein network breakdown.

Accordingly, the use of native potato protease inhibitor isolate can effectively be used to improve the dough properties even after long proofing times. In addition, the use of native potato protease inhibitor isolate allows the use of lower grade flour with lower gluten content.

Suitably, the native potato protein isolate can have a protein content of 90% or more based on dry matter (weight of total Kjeldahl nitrogen multiplied by 6.25), preferably 92% or more, more preferably 95% or more. The potato protein isolate can have a protein content of 85% or more based on the total weight of the protein isolate (weight of total Kjeldahl nitrogen multiplied by 6.25).

The inventors further found that the use of protease inhibitor in a fermented dough based food product can lead to higher water retention in the food product after baking. Further, the elasticity of the resulting food product is increased.

Because the native potato protease inhibitor isolate strengthens the dough, the amount of added cross-linking and oxidising agents can be reduced. Furthermore, it was found that only a relatively small dosage of native potato protease inhibitor isolate is required to achieve the desired effect. In addition to affecting the gluten-network, the presence of proteases also results in additional free amino acids that can take part in maillard reactions. This reaction causes the formation of specific flavour and colour compounds, which can be desirable.

The native potato patatin isolate is a source of oxidative enzymes and lipases. It can be advantageously used to replace commonly used oxidative agents in dough formulations, because the native potato patatin isolate is label-free. With the growing market for E-number free products this is desirable. Also the dosage of native potato patatin isolate can be relatively low in order to achieve the desired effect.

In addition, the native potato patatin isolate enhances the water retention in the food product after baking. Also, the native potato patatin isolate leads to a food product after baking that is compact and has a regular structure.

The combination of native potato protease inhibitor isolate and native potato patatin isolate has a synergistic effect in that break-down of the gluten network is reduced by the protease inhibitor isolate, while at the same time the patatin isolate is able to cross-link and thereby strengthen the gluten network, and inherently the dough, even further. The patatin isolate is capable of providing better dough handling and generate emulsifiers in situ. In turn, this yields better proofing behaviour.

Existing methods for isolating potato proteins and potato protein fractions include fractionation, ion exchange, gel permeation, ultrafiltration, affinity and mixed-mode chromatography, and fractionation by heat coagulation. Conventional heat coagulation, however, yields a potato protein isolate having a protein content of about 70-80% based on dry matter.

The native potato protein isolates used in the invention may be isolated according to any mild known process, by which the enzymatic activity is not inactivated to a large extent, and which yields a potato protein isolate with sufficiently high protein content.

An example of a suitable isolation method is described in WO-A-2008/069650. Herein a selective and efficient process for the isolation of native potato protein isolates and the different patatin protease inhibitor fractions is described.

According to the process of WO-A-2008/069650, which is herewith incorporated by reference, potato fruit juice (the undiluted juice from potato tuber) is preferably first pretreated by a divalent metal cation at a pH of 7-9 to flocculate undesired material. The removed undesired material can typically include negatively charged polymers, pectins, glycoalkaloids, and micro-organisms from the potato fruit juice. In particular, the removal of pectins and glycoalkaloids is advantageous, since these compounds adhere to the potato proteins and may cause flocculation. These compounds thus lead to an unstable protein isolate. Then, the flocks are separated from the potato fruit juice by centrifugation. The supernatant is subjected to expanded bed chromatography operated at a pH of less than 11 and a temperature of 5-35° C. using an adsorbent which binds native potato protein. Finally, the native potato protein is eluted from the adsorbent with a suitable eluent. This process yields highly pure native potato protein isolate with a minimum of denatured protein and stable solubility. The native potato protein isolate can have an isoelectric point above 4.8, a molecular weight of more than 5 kDa and a glycoalkaloid concentration of less than 150 ppm.

If mixed mode adsorbentia are used, the native potato proteins can be fractionated to both isoelectric point and molecular weight. This allows separating the patatin and protease inhibitor fractions. The mixed mode adsorbentia can be used in two modes. The first mode is selective elution, which comes down to binding of essentially all of the potato protein and subsequently eluting a first desired potato protein fraction with an appropriate buffer and eluting a second desired potato protein fraction with another appropriate buffer. The second mode is selective adsorption, which comes down to binding of a first desired potato protein fraction on one column at an elevated pH, and adjusting the effluent to a lower pH so that a second desired potato protein fraction can bind on a second column. The protease inhibitors are eluted at a pH of 5.8-12.0, preferably at a pH of 6.0-9.5.

After elution, the native potato proteins may be concentrated by ultrafiltration. This may further reduce the amount of undesired compounds, such as glycoalkaloids. For protease inhibitors the ultrafiltration is typically carried out at a pH of 3-7, preferably 3.2-4.5. Apart from ultrafiltration other concentration methods can be applied such as evaporation, freeze concentration, or isoelectric precipitation using carbon dioxide.

Typically, this process yields a potato protein isolate having a protein content of 90% based on dry matter (weight of total Kjeldahl nitrogen multiplied by 6.25). The material typically comprises 3-7 wt. % moisture.

According to the method of the invention, a dough is prepared, which dough comprises a native potato protein isolate. The amount of native potato protein isolate in the dough can be less then 3 wt. %, based on the total weight of flour in the dough, preferably less than 2 wt. %, more preferably less than 1 wt. %. The effect is already significant if an amount of 0.1 wt. % native potato protein isolate is included in the dough.

The native potato protein isolate can comprise native potato protease inhibitor, native potato patatin, or both. The amount of native potato protease inhibitor and/or native potato patatin in the dough can be less than 1 wt. %, based on the total weight of flour in the dough, preferably less than 0.7 wt. %, more preferably in the range of 0.1-0.5 wt. %.

In an embodiment the native potato protein isolate in the dough comprises protease inhibitors that are capable of inhibiting proteolytic activity. Preferably, the protease inhibitors inactivate at least 70% of the initial proteolytic activity, more preferably at least 75%, and even more preferably at least 80%. The proteolytic activity in this context is meant to refer to an enzymatic assay in which the amount of absorbance units at 440 nm that are extracted from dough containing 5 mg azocasein per gram of dough after a 16 hour incubation at 37° C. and native dough pH and can be measured according to the method specified in Example 1 below.

The native potato protein (native potato patatin isolate, native potato protease inhibitor isolate, or a combination thereof) can be included in the dough in different ratios and different forms, such as in the form of a powder and/or in the form of a concentrate. The concentrate will ensure the stabilisation of oxidases that are sensitive to the drying process.

Different ratios of oxidase and lipase activity can be obtained by various forms and additional processing. A high oxidase activity can be obtained by using a protein concentrate. A suitable protein concentrate can for instance be produced by ultrafiltration of a protein solution such as obtained using a suitable isolation method described in WO-A-2008/069650. Enriched lipoxygenase activity can be obtained by concentrating the patatin isolate using a 100-300 kDa membrane. The ultrafiltration can suitably be conducted at a pH of 5.5-8, preferably at a pH of 6-7, more preferably at a pH of about 6.5. The majority of the 90 kDa lipoxygenase protein is retained by the membrane while other components are allowed to pass through the membrane. Thus, the majority of the patatin proteins are present in the permeate, while the lipoxygenase activity remains in the concentrate. It was found that such concentrate is highly enriched in lipoxygenase activity with minor amounts of peroxidase activity remaining. Lipase activity is somewhat enriched and polyphenols oxidase activity is enriched. This lipoxygenase activity enriched concentrate is well-suited for use as a dough improver, as an industrial enzyme, or as a source for industrial enzymes for the specific manufacture of flavour compounds through the hydroperoxidation of polyunsaturated compounds. While the potato fruit juice preparation concentrate (the permeate) yields a turbid unstable emulsion rich in protease inhibitors, potato fibres and starch, the lipoxygenase enriched potato protein isolate is a stable solution.

Dough comprising this lipoxygenase activity enriched potato protein isolate as a dough improver results in breads having better strength (due to cross-linking of fatty acids), having enhanced bread volume, and having a bleached appearance.

Spray drying the potato protein isolate with air inlet temperatures of 200-250° C., air outlet concentrations of 150° C., a product temperature of 60-90° C., preferably 70-80° C., such as about 75° C., results in a preparation containing lipase activity and virtually no lipoxygenase or peroxidase activity.

Furthermore, the inventors found that a lipase activity enriched potato protein isolate can be obtained by mildly heating (such as at a temperature of 40-70° C.) a dried native patatin isolate with 3-5 wt. % moisture (for instance a native potato patatin isolate as obtained using the isolation method described in WO-A-2008/069650) for several days (such as 2-6 days). This treatment results in a decrease of the lipoxygenase and peroxidase activities, while the lipase activity is maintained. The reduction of the lipoxygenase and peroxidase activities depends on both the time of heating and the exact heating temperature. This lipase activity enriched potato protein isolate can be used as a dough improver, as well as other lipase specific applications.

Dough comprising this lipase activity enriched potato protein isolate as a dough improver show an increase in extensibility as determined from visco-elastic measurements. Furthermore, breads baked from such dough show a clear increase in tenderness of the crumb relative to a control. In addition, the dough has better handling properties.

The enzymes have a broad temperature range between 15 and 42° C. and a pH range between 4.5 and 7.0. The effects of the enzymes and protease inhibitors are most pronounced in long proofing times and low gluten doughs.

The dough can comprise various types of flour, such as wheat flour, rye flour, barley flour, buckwheat flour, corn flour, lima bean flour, oat flour, soybean flour, sorghum flour, potato flour and/or rice flour.

The dough of the invention can further comprise conventional ingredients such as water, yeast, salt (such as sodium chloride, calcium acetate, sodium sulphate and/or calcium sulphate), proteins (such as milk powder, gluten and/or soy), eggs (whole eggs, egg yolks or egg whites), antioxidants (such as ascorbic acid), oxidising agents (such as potassium bromate, potassium iodate, azodicarbonamide or ammonium persulphate), amino acids (such as L cysteine), and sugar.

The mixing of the dough ingredients can be done by any means known in the art.

The dough can be baked under conditions known in the art, depending on the food product to be prepared. A process according to the invention is in principle suitable for any kind of baked product, and in particular for bread.

In a further aspect the invention is directed to a fermented dough based food product obtainable by any one of the preceding claims. This food product has improved properties, such as water retention, elasticity, and/or tenderness of the crumb.

In a further aspect the invention is directed to the use of a native potato protein isolate as an improving agent for food products based on fermented dough. As described hereinabove, the native potato protein isolate is capable of enhancing the water retention, the elasticity and/or the tenderness of the crumb, but also to replace commonly used oxidative agents in dough formulations. In particular, inactivation of endogenous and microbial proteases in dough by native protease inhibitors results in firm, workable dough, whereas for example inactivation by acetic acid results in an undesirable moist, fluid, glistening dough.

In a further aspect the invention is directed to a bread improver comprising a native potato protein isolate as described herein. The native potato protein isolate can comprise native potato patatin and/or native potato protease inhibitor.

In a further aspect the invention is directed to dough comprising a bread improver as defined above.

The invention will now be illustrated by means of the following non-limiting examples.

EXAMPLES

Example 1

Inhibition of Proteases in Food Processes

Method

A 20 mg/ml azocasein (Fluka, Germany) solution was prepared in demineralised water. Doughs were prepared by the addition of this azocasein solution, a 4% (w:v) protease inhibitor (PI) solution (Solanic, Netherlands), glacial acetic acid (Merck 10056), a 10 mg/ml solution trypsin (Bovine pancreas, Sigma-Aldrich) and demineralised water according to Table 1 to 1 g of wheat flour (Interall, Netherlands).

The native PI solution is obtained using method 10 as described in WO-A-2008/069650. The eluates are concentrated by ultra filtration to 20% dry matter and spray dried. The PI powder contained 95% protein.

TABLE 1

Preparation of dough

| Sample | Label | mg flour | µL 20 mg/ml azocasein | µL 4% PI | µL 10 mg/ml trypsin | µL glacial acetic acid | µL water |
|---|---|---|---|---|---|---|---|
| 1 | Control | 1 140 | 0 | 0 | 0 | 0 | 1 140 |
| 2 | Endogenous | 1 120 | 560 | 0 | 0 | 0 | 560 |
| 3 | 10 mg PI | 1 020 | 510 | 250 | 0 | 0 | 260 |
| 4 | 10 µL acetic acid | 1 150 | 575 | 0 | 0 | 12 | 563 |
| 5 | 5 mg trypsin | 1 130 | 565 | 0 | 565 | 0 | 0 |

The small doughs with flour obtained from Interall (Helmond, The Netherlands) were kneaded for several minutes and incubated overnight at 37° C. Incubated doughs were weighed into plastic tubes and extracted by vigorous shaking with 4 ml per gram dough of 0.25% (v:v) acetic acid solution or by 4 ml of demineralised water in the case of sample 4 which already contained acetic acid. The plastic tubes were centrifuged for 5 min at 500 g at ambient temperature to remove insoluble parts of the dough and undegraded azocasein. 0.5 ml aliquots of each supernatant were diluted with 1 ml of 0.1 M NaOH to solubilise the chromophoric peptides and centrifuged for 5 min at 16 000 g in an eppendorf centrifuge. This resulted in a small brown pellet, a clear solution and a fluffy layer floating on top. The solution was removed from the tubes by careful pipetting. The solution obtained in this way was analysed spectroscopically at 440 nm on a BioRad SmartSpec in a 1 ml cuvet.

Results

Absorbencies obtained in the above assay were zeroed against the control dough extract that did not contain azocasein (sample 1) and are reported in FIG. 1. Clearly, when azocasein is added to dough an increase in absorbance is observed. This increase in absorbance shows the endogenous protease activity in the dough. The addition of concentrated acetic acid to dough resulted in a sharp decrease of pH and inactivation of some of the proteolytic activity. The addition of a concentrate native potato protease inhibitor isolate shows a larger inhibition of more than 82%. However, while the addition of acetic acid resulted in a moist, fluid, glistening dough, the addition of protease inhibitors resulted in firm dough. As expected, the positive control, addition of additional protease in the form of trypsin gives a sharp increase in absorbance.

Example 2

Results on Dough Proofing

| Recipe for 565 g Wholemeal/W-flour pro whole bread | | |
|---|---|---|
| Sample | 1 | 2 |
| Wholemeal | 80 parts | 80 parts |
| W-flour | 20 parts | 20 parts |
| Bakery yeast | 2 parts | 2 parts |
| Salt | 2 parts | 2 parts |
| Soft bakery fat | | |
| PI-powder[a] | | 0.50 parts |
| Water | 66 parts | 66 parts |
| Total | 170 parts | 170.5 parts |

-continued

| Recipe for 565 g Wholemeal/W-flour pro whole bread | | | |
|---|---|---|---|
| Sample | parts | 1 | 2 |
| Wholemeal | 80 | 3 576.5 | 3 566.0 |
| W-flour | 20 | 894.1 | 891.5 |
| Bakery yeast | 2 | 89.4 | 89.1 |
| Salt | 2 | 89.4 | 89.1 |
| PI-powder[a] | | 0.0 | 22.3 |
| | | 0.0 | 0.0 |
| Water | 62 | 2 950.6 | 2 941.9 |
| Total | 167 | 7 600.0 | 7 600.0 |

[a]protein content: 95% based on dry matter

Processing

The water was cooled to the required temperature 22° C. Kneading was started with 55 parts of water. When the dough was developed sufficiently, the rest of water was added. The dough was kneaded off to a smoothly dough (1200 revolutions on a spiral mixer). Next, 935 g of dough was weighed off using dry matter calculation. After kneading the pH of the dough was measured on a pH meter InoLab pH 720 with a SenTix 41pH electrode that was inserted directly into the dough. Then, a piece of dough with a smoothly dough skin was puffed up. Bulge-rising was performed for 30 min, followed by 40 min of point-rising, and about 60 min of after-rising. The rise cabinet was kept at 30° C. and a relative humidity of 80%. Then the dough was baked at 240° C. for about 45 min.

Bread Strength Analysis

A texture analyser (SMS Stable Microsystems) was used for analysing bite and breakage properties. A slice of bread of 5 cm wide was cut out from the middle of the bread. The slice of bread was put under a 90° cone of the texture analyser. The cone was pressed 2.5 cm in the slice of bread during 45 s. The force is a value for the tenderness, the higher the value the higher the tenderness of the crumb.

Results of Baking

Figure 2B:
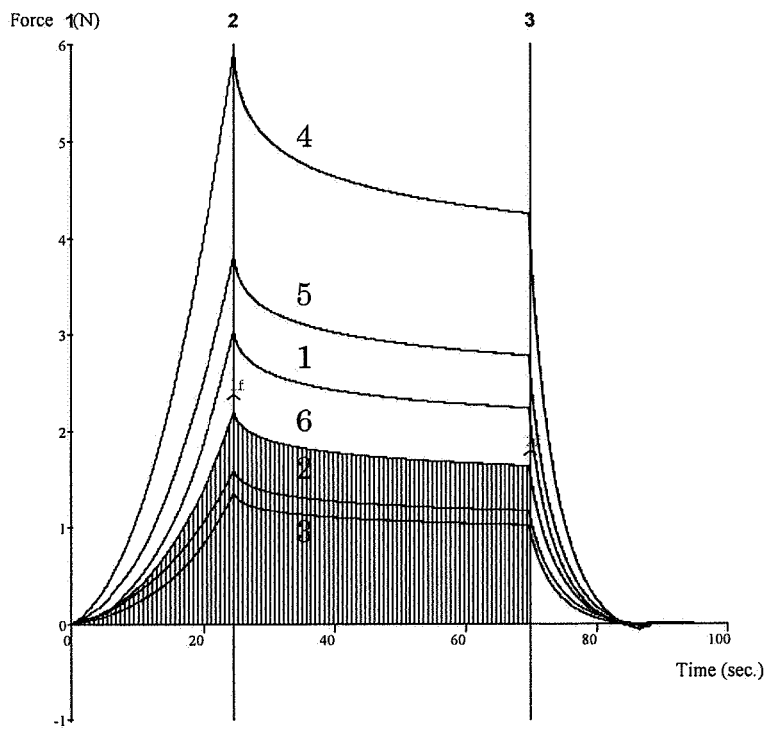
FIG. 2B is a graphic representation of the Force verses time of different bread examples.
Figure 3A:
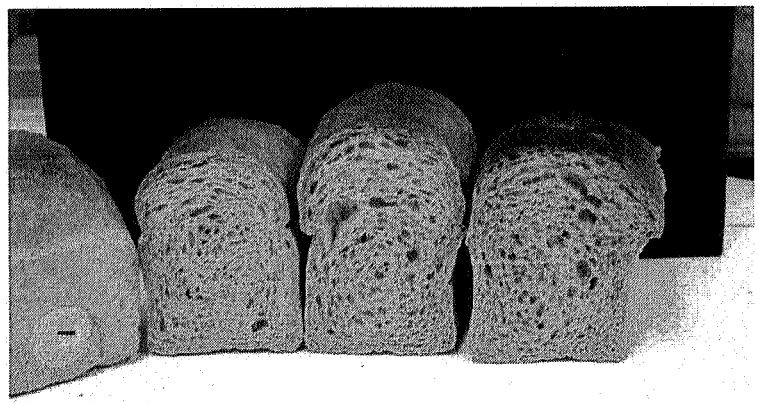
FIG. 3A is a photograph of breads 1, 2, and 3 showing the bread crumb.
Figure 3B:
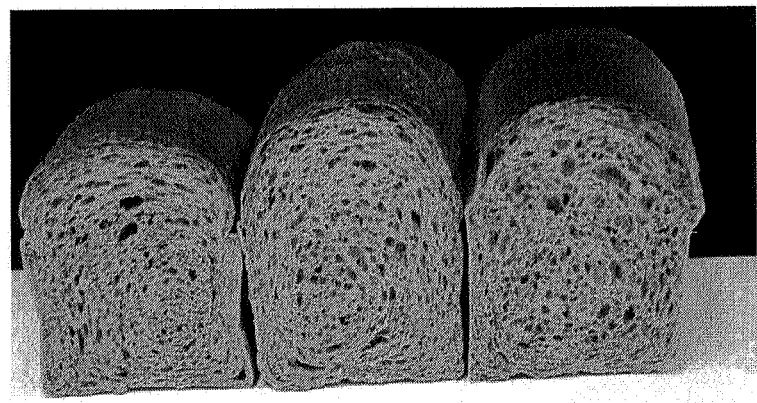
FIG. 3B is a photograph of breads 4, 5, and 6 showing the bread crumb.

Table 2 shows the properties of breads after baking with and without native potato protease inhibitors for different proofing times. The strength of the different breads as measured by the texture analyser is shown in FIGS. 2A and 2B. FIG. 3A is a photograph of breads 1, 2 and 3 (from left to right) showing the bread crumb. FIG. 3B is a photograph of breads 4, 5 and 6 (from left to right) showing the bread crumb.

TABLE 2

| Sample | Additive | Additional Proofing time [h] | Weigh bread (g) | Bread strength Force [N] After 25 s | Force [N] After 70 s |
|---|---|---|---|---|---|
| Bread 1 | — | 0 | 807 | 3.001 | 2.176 |
| Bread 2 | — | +1 | 812 | 1.576 | 1.140 |
| Bread 3 | — | +2 | 790 | 1.345 | 0.992 |
| Bread 4 | PI$^a$ | 0 | 823 | 5.856 | 4.123 |
| Bread 5 | PI$^a$ | +1 | 821 | 3.772 | 2.702 |
| Bread 6 | PI$^a$ | +2 | 801 | 2.172 | 1.596 |

$^a$protein content: 95% on dry matter basis

Extended proofing times reduce the strength of the resulting bread as given in Bread 1-3. The use of 0.5 parts of native potato protease inhibitor greatly reduces the loss in bread strength. Furthermore, the bread shows a higher elasticity combined with a higher moisture retaining ability. This makes the use of native potato protease inhibitor fraction a suitable bread improver for low gluten types of flours and to obtain higher water retention in bread with a higher elasticity.

Example 3

Use of High Molecular Weight Fraction as Dough Improver

Potato contains both peroxidase, polyphenols oxidase, lipoxygenase activity and phospholipase and lipase activity that will perform effectively in a dough system.

The following procedure (method 9 of WO-A-2008/069650) yields a material with all the enzymatic activity required for oxidation, lipoxidation and lipid breakdown.

130 ml of Fastline PRO column material (25 cm bed height) was equilibrated with 5 column volumes (CV) of 20 mM citrate buffer pH 4.8. Approximately 650 ml (5 CV) of potato fruit juice from the potato factory at Ter Apelkanaal (The Netherlands) was adjusted to a pH of 4.8 and loaded on the column. After loading, the column was washed with 5 CV of 20 mM citrate buffer pH 4.8. Patatin was eluted in 6 CV of 20 mM citrate buffer pH 6.0. After elution the patatin fractions (pH 6.3) was concentrated by ultrafiltration using a 30 kDa membrane. The patatin concentrate had a protein content of 5.3 wt. % based on total weight. Spray dried patatin powder (having a moisture content of 5-7 wt. %) had a protein content of 85 wt. % based on total weight. Table 3 shows the enzymatic activity in the native potato patatin isolates.

TABLE 3

| Average U/mg protein | Dried Powder | Std | EBA Eluate | Std | Concentrate 10% protein | Std |
|---|---|---|---|---|---|---|
| Lipoxygenase | 0.013 | 0.010 | 2.250 | 0.8061 | 3.370 | 0.158 |
| Peroxidase | 0.000 | 0.0001 | 0.008 | 0.0009 | 0.011 | 0.0006 |
| Polyphenol oxidase | 0.104 | 0.079 | 0.039 | 0.0041 | 0.028 | 0.017 |
| Lipase | 0.131 | 0.0108 | 0.116 | 0.0327 | 0.171 | 0.0013 |

Required amounts of native potato patatin isolates per kilogram of flour to achieve the desired dough effects can be obtained with relatively low amounts of native potato patatin isolate. For equivalent activity dosing in bread improver the following dosages of the potato protein isolates can be employed per kg wheat flour. Based on lipase activity: 3.82 gram spray dried patatin powder per kg dough. Based on both lipase and lipoxygenase activity: 2.9 ml patatin concentrate with 10% protein and 3.62 gram spray dried patatin powder per kg dough. Based on lipoxygenase activity: 2.90 ml patatin concentrate per kg dough.

| Recipe for 565 g Wholemeal/W-flour pro whole bread | | | | |
|---|---|---|---|---|
| | Sample | | | |
| | 1 | 2 | 3 | 4 |
| Wholemeal (Acacia) | 80 parts | 80 parts | 80 parts | 80 parts |
| W-flour (Aster) | 20 parts | 20 parts | 20 parts | 20 parts |
| Bakery yeast | 2 parts | 2 parts | 2 parts | 2 parts |
| Salt | 2 parts | 2 parts | 2 parts | 2 parts |
| Soft bakery fat | 1 part | 1 part | 1 part | 1 part |
| Patatin-powder | | 0.38 parts | | 0.36 parts |
| Patatin-concentrate | | | 0.29 parts | 0.29 parts |
| Water | 62 parts | 62 parts | 62 parts | 62 parts |
| Totaal | 167 parts | 167 parts | 167 parts | 168 parts |

| | | Sample | | | |
|---|---|---|---|---|---|
| | parts | 1 | 2 | 3 | 4 |
| Wholemeal (Acacia) | 80 | 1 820.4 g | 1 816.2 g | 1 817.2 g | 1 813.3 g |
| W-flour (Aster) | 20 | 455.1 g | 454.1 g | 454.3 g | 453.3 g |
| Bakery yeast | 2 | 45.5 g | 45.4 g | 45.4 g | 45.3 g |
| Salt | 2 | 45.5 g | 45.4 g | 45.4 g | 45.3 g |
| Soft bakery fat | 1 | 22.8 g | 22.7 g | 22.7 g | 22.7 g |
| Patatin-powder | | 0.0 g | 8.7 g | 0.0 g | 8.2 g |
| Patatin-concentrate | | 0.0 g | 0.0 g | 6.6 g | 6.6 g |

-continued

| Recipe for 565 g Wholemeal/W-flour pro whole bread | | | | | |
|---|---|---|---|---|---|
| Water | 62 | 1 410.8 g | 1 407.6 g | 1 408.3 g | 1 405.3 g |
| Total | 167 | 3 800.0 g | 3 800.0 g | 3 800.0 g | 3 800.0 g |

Processing

Kneading was started with 55 parts of water. When the dough was developed sufficiently, the rest of water was added. The dough was kneaded off at 22° C. to a smoothly dough. (1 200 revolutions on a spiral mixer) Next, 935 g of dough was weighed off using dry matter calculation. After kneading the pH of the dough was measured on a pH meter InoLab pH 720 with a SenTix 41pH electrode that was inserted directly into the dough. Then, a piece of dough with a smoothly dough skin was puffed up. Bulge-rising was performed for 30 min, followed by 40 min of point-rising, and about 60 min of after-rising. The rise cabinet was kept at 30° C. and a relative humidity of 80%. Then the dough was baked at 240° C. for about 45 min.

The bread strength was analysed as described in Example 2.

The following samples were prepared.
C001 Standard
C002 Standard+high mw protein isolate powder
C003 Standard+high mw protein isolate liquid
C004 Standard+high mw protein isolate powder and liquid
C005 Standard (duplicate)
C006 Standard+high mw protein isolate powder (duplicate)
C007 Standard+high mw protein isolate liquid (duplicate)
C008 Standard+high mw protein isolate powder and liquid (duplicate)

After proofing dough CS001-CS004, the standard (CS001) has a bit more volume in comparison to CS002-CS003

The breads are weighing after baking.

| Bread | Mass (g) |
|---|---|
| CS001 | 811.7 |
| CS002 | 839.9 |
| CS003 | 845.0 |
| CS004 | 839.6 |

A better water holding capacity is observed by adding native potato patatin isolates. Bread with potato protein is more compact and the structure is regular.

Figure 4A:
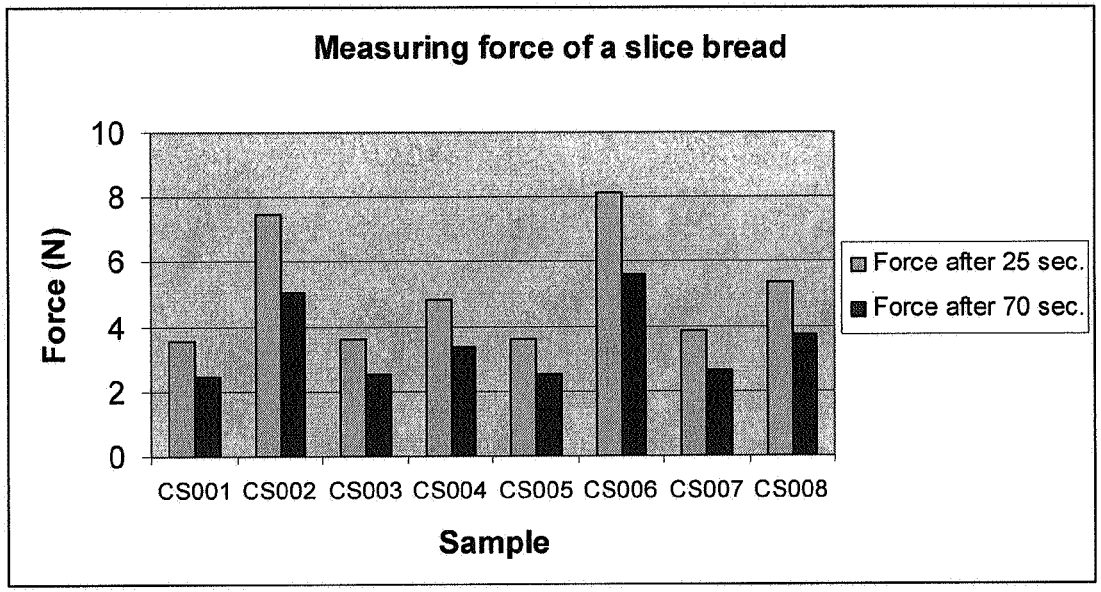
FIG. 4A shows the measuring force of a slice of bread of different examples.
Figure 4B:
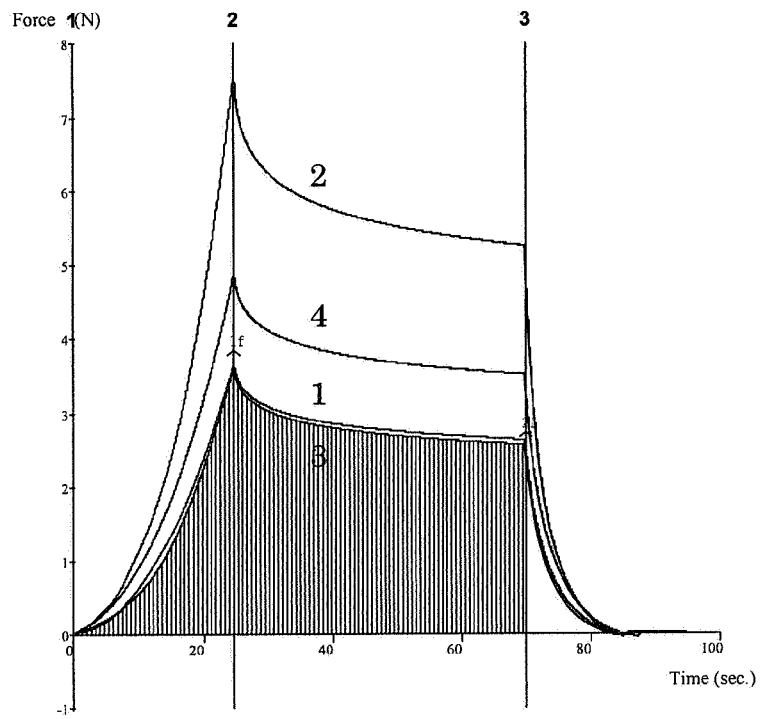
FIG. 4B is a graphic representation of the Force verses time of different bread examples.

The bread strengths of the samples are shown in FIGS. 4A and 4B. In FIG. 4B 1 represents the reference, 2 represents the sample with patatin powder, 3 represents the sample with patatin concentrate, and 4 represents the sample with patatin powder and patatin concentrate. At CS002 and CS006 the highest force is needed to go through slice bread. Regarding tenderness, the standard (CS001) bread needs a lower force in comparison to bread CS002 and CS004, while CS003 has needed the same force.

Figure 5A:
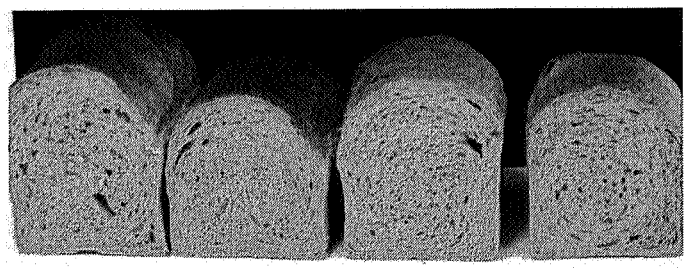
FIG. 5A is a photograph of bread crumbs of CS001-CS004.
Figure 5B:
FIG. 5B is a photograph of breads CS001-CS004.

The bread crumbs of CS001-CS004 (from left to right) are shown in the photograph of FIG. 5A. Photographs of breads CS001-CS004 (from left to right) are shown in FIG. 5B. The elasticity of breadcrumb with lipase activity is significantly higher. The highest volume is obtained with the standard bread, followed by bread with high levels of lipoxygenase activity. CS003 shows a clear bleaching of the bread crumb reflecting overdosing of the oxidative enzymes. Lower dosing of native potato patatin isolate concentrates is needed to further optimise the balance between oxidative activity and lipase action during proofing. This will allow lower dosing of the native potato patatin isolates at levels below 0.5% to improve bread development.

The standard is developed in smell, structure (crumb and crust) and volume very well, typical normal bread. Bread with addition of lipase isolate gives a more elastic bread in comparison to the standard.

Example 4

Preparation of a Potato Protein Isolate Specifically Enriched in Lipoxygenase

A lipoxygenase-enriched potato protein isolate was obtained by subjecting a native patatine fraction solution (as described in WO-A-2008/069650) to ultrafiltration at 3 bar and ambient temperature on a circular M-180 MWCO membrane (Koch) with a cut-off of 100 kDa or on a circular 100 kDa MWCO polyethersulphone membrane (Millipore) or on a 300 kDa MWCO polyethersulphone membrane (Millipore). 3 to 4 hours of ultrafiltration sufficed to reduce a 180 ml to 3 ml. The protein content of the thus obtained concentrate was more than 90% on dry matter basis.

The protein concentrate obtained in this way was analysed for the major enzymatic activities that are known to occur in patatin products. Surprisingly, the concentrate was highly enriched in lipoxygenase activity with minor amounts of peroxidase activity remaining (see Table 4). Lipase activity was somewhat enriched and polyphenol oxidase activity was enriched.

TABLE 4

Major enzymatic activities in units per ml in lipoxygenase concentrate versus potato fruit juice

| Enzymatic activity | lipoxygenase concentrate | potato fruit juice |
|---|---|---|
| Lipoxygenase | 375 ± 4 | 13.1 ± 0.01 |
| Lipase | 5.1 ± 0.2 | 0.72 ± 0.04 |
| Polyphenoloxidase | 2.61 ± 0.03 | 0.103 ± 0.004 |
| Peroxidase | 0.1242 ± 0.009 | 0.41 ± 0.01 |

Example 5

Preparation of a Potato Protein Isolate Specifically Conditioned for Lipase Activity A potato protein preparation rich in lipase activity and low in lipoxygenase and peroxidase activity was prepared by heating a patatin powder (as obtained according to WO-A-2008/069650) for several days at mild temperatures. The protein content of the thus obtained concentrate was 91.3% on dry matter basis.

Table 5 shows the enzymatic activities in the final powder obtained after a 5 day incubation at 65° C.

TABLE 5

Enzymatic activities in units per gram of powder after a 5 day-heat treatment at 65° C.

| Activity U/g | Untreated | Treated |
|---|---|---|
| Lipase | 152 | 125 |
| Lipoxygenase | 23 | 6.7 |
| Peroxidase | 193 | 0.008 |

Example 6

Use of Lipase-Enriched Potato Protein Isolate as a Dough Improver

To assess the effect of a lipase-rich potato protein preparation as prepared in Example 5, dough was prepared according to the recipe specified in Table 6. In addition to the lipase preparation, some coconut oil was added to serve as substrate, allowing the release of free fatty acids that lubricate the dough.

TABLE 6

Dough composition for lipase activity tests.

| Sample | Brandname | 0 units/kg | 250 units/kg | 500 units/kg |
|---|---|---|---|---|
| Flour Gerbera | Meneba | 100.0% | 99.7% | 99.3% |
| Yeast pressed | | 2.0% | 2.0% | 2.0% |
| NaCl | Jozo | 2.0% | 2.0% | 2.0% |
| Coconut oil | Cargill | 2.0% | 2.0% | 2.0% |
| Lipase preparation* | Solanic BV | | 0.34% | 0.67% |
| Water | Tap | 59.0% | 59.0% | 59.0% |
| Total | | 165% | 165% | 165% |

*according to procedure in Example 5

Dough used for visco-elasticity measurement was processed according to the method outlined under Procedure for preparing dough for visco-elasticity testing, while the dough used for bread-making was processed according to the procedure under Processing bread.

Procedure for Preparing Dough for Visco-Elasticity Testing

Water was cooled to the required temperature and added to the dry ingredients and kneaded for 1250 rotations on a spiral mixer. 120 g pieces of dough were weighed off and puffed up. These were covered with plastic foil at ambient temperature for 30, 60 or 90 min. Subsequently these were flattened out to 2 mm thickness with a dough rolling machine. After 15 minutes, the visco-elasticity of the dough was determined on a SMS Stable Microsystems Texture Analyser.

Processing Bread

Water of the appropriate temperature was added to the dry ingredients and kneaded for 1250 rotations on a spiral mixer. After kneading, 900 g pieces of dough were weighed off. These pieces were puffed up and allowed to rise for 40 min. The dough was then formed into a point and allowed to rise for 50 min. Upon shaping the dough was allowed to rise for an additional 60 min at 30° C. and 80% humidity. The dough was then baked for 35 min at 240° C.

The visco-elasticity measurements revealed an increase in extensibility in lipase-treated dough (Table 7). No significant differences in elasticity were observed for the doughs prepared according to the recipe in Table 6.

TABLE 7

Force ratios in lipase-treated dough.

| Lipase dosing Units | Time min | Force 1 | std | Force 2 | std | Ratio Force 2/Force 1 |
|---|---|---|---|---|---|---|
| 0 | 30 | 31.4 | 2.2 | 19.6 | 1.2 | 0.63 |
| 250 | 30 | 35.8 | 1.7 | 21.8 | 1.1 | 0.61 |
| 500 | 30 | 34.4 | 0.98 | 20.5 | 0.45 | 0.60 |
| 0 | 60 | 32.6 | 1.4 | 20.2 | 0.67 | 0.62 |
| 250 | 60 | 38.5 | 2.1 | 24.1 | 0.72 | 0.63 |
| 500 | 60 | 36.2 | 2.1 | 22.5 | 1.54 | 0.62 |
| 0 | 90 | 32.1 | 1.3 | 20.3 | 1.2 | 0.63 |
| 250 | 90 | 35.4 | 1.9 | 22.3 | 1.0 | 0.63 |
| 500 | 90 | 35.4 | 1.7 | 22.5 | 0.96 | 0.64 |

Breads baked using the doughs described above were analysed for tenderness using a SMS stable Microsystems texture analyser equipped with a 90° cone. From the middle of the bread a 5 cm wide slice of bread was placed under the analyser and the probe was inserted 2.5 cm into the bread over a time period of 45 s, while measuring the required force. The force experienced by the cone is a measure of tenderness, the higher the value the higher the tenderness of the crumb.

Upon analysing breads, both regular and French loaf, prepared from the dough system described above, a clear increase in tenderness is observed for dough treated with lipase relative to a control. In addition the specific volumes of the breads were measured. This revealed that dough treated with lipase has a specific volume approximately 10% lower than an untreated control. The decrease can be adjusted in additional optimisation of recipes and procedures by people skilled in the art.

Example 7

Use of Lipoxygenase-Enriched Potato Protein Isolate as a Dough Improver

A lipoxygenase-enriched potato protein preparation as described in Example 4 was added to dough at levels of either 500 or 1500 units per kilogram flour. Dough was prepared according to Table 8. Flour was obtained from Meneba (the Netherlands) Yeast from Gistbrocades (the Netherlands).

TABLE 8

Recipe for bread with lipoxygenase activity enriched isolate

| Sample | 0 units/kg | 500 units/kg | 1500 units/kg |
|---|---|---|---|
| Flour (Gerbera) | 100% | 99.90% | 100% |
| Pressed Yeast | 2% | 2% | 2% |
| NaCl | 2% | 2% | 2% |
| lipoxygenase activity enriched isolate | | 0.13% | 0.39% |
| Water | 60% | 59.80% | 59.70% |
| Total | 164% | 164% | 164% |

Visco-Elasticity were Measured According to the Method Described in Example 6

After kneading, the dough containing lipoxygenase activity enriched isolate is somewhat sticky while dough without lipoxygenase activity enriched isolate is supple. During proofing, the stickiness of the dough treated with lipoxygenase activity enriched isolate diminishes until it is equal to that of dough without lipoxygenase activity enriched isolate.

In dough comprising lipoxygenase activity enriched isolate has a considerable greater extensibility after the dough has rested 60 min, while the elasticity remains essentially unchanged. This should increase rise-tolerance of the dough, allowing for an increase in bread volume.

Table 9 shows the visco-elasticity and extensibility of the dough treated with lipoxygenase activity enriched isolate. The values labelled 'Force 1' are the forces experienced by the cone at 5 s, while 'Force 2' is the force at 10 s. In dough with lipoxygenase activity enriched isolate, the max force (Force 1) is significantly higher, indicating that the extensibility of dough with lipoxygenase activity enriched isolate is higher. The ratio between Force 1 and Force 2 is a measure for elasticity and remains equal. Furthermore, the dough tolerance is higher and dough is less sensitive for vibrations.

TABLE 9

Extensibility and elasticity of dough treated with lipoxygenase activity enriched isolate.

| | Force 1 (g) | STDEV 1 (g) | Force 2 (g) | STDEV 2 (g) | Ratio |
|---|---|---|---|---|---|
| Visco-elasticity after 30 min | | | | | |
| 0 units | 47.92 | 2.43 | 24.32 | 0.92 | 0.51 |
| 500 units | 51.14 | 1.55 | 26.88 | 1.94 | 0.53 |
| 1500 units | 56.50 | 2.69 | 29.5 | 1.38 | 0.52 |
| Visco-elasticity after 60 minutes | | | | | |
| 0 units | 49.90 | 2.69 | 26.04 | 1.72 | 0.52 |
| 500 units | 59.94 | 2.71 | 32.18 | 3.03 | 0.54 |
| 1500 units | 58.74 | 2.47 | 31.70 | 1.15 | 0.54 |
| Visco-elasticity after 90 minutes | | | | | |
| 0 units | 49.88 | 1.70 | 26.32 | 2.04 | 0.53 |
| 500 units | 53.18 | 1.75 | 28.38 | 0.89 | 0.53 |
| 1500 units | 57.98 | 3.02 | 31.86 | 3.22 | 0.55 |

In bread with lipoxygenase activity enriched isolate the volume is significantly increased by 10 to 15 percent relative to a control bread.

Example 8

Use of Lipase-Enriched Potato Protein Isolate as a Dough Improver

To assess the effect of a lipase activity enriched potato protein isolate as prepared in Example 5, dough was prepared according to the recipe specified in Table 10.

TABLE 10

Recipe for bread with lipase activity enriched isolate

| Sample | 0 units/kg | 500 units/kg | 1500 units/kg |
|---|---|---|---|
| Flour (Gerbera) | 100% | 99.3% | 98.0% |
| Pressed Yeast | 2.0% | 2.0% | 2.0% |
| NaCl | 2.0% | 2.0% | 2.0% |
| lipase activity enriched isolate | | 0.67% | 2.01% |
| Water | 60% | 60.0% | 58.0% |
| Total | 164% | 164% | 162% |

Compared to the reference, dough with lipase activity is somewhat stickier. This is probably caused by a decrease in water absorption that occurs upon increasing the lipase level. For all doughs the visco-elasticity was determined on a texture analyser after 30, 60 or 90 min of proofing.

In Table 11 values corresponding to dough extensibility and elasticity are given. The values labeled 'Force 1' are the forces experienced by the cone at 5 s, while 'Force 2' corresponds with the force at 10 s. Force 1 is a measure for extensibility and the ratio between force 1 and Force 2 is a measure for elasticity.

The closer the ratio is to 1.00, the more elastic the dough. No significant difference on elasticity throughout the proofing time is measured. In dough with 1500 units lipase the elasticity is lower after 30 min, because dough is less developed in comparison to dough with less activity. However, the elasticity recovers after 60 min of proofing. A clear increase is observed on the extensibility of the dough upon addition of 1500 units of lipase activity.

TABLE 11

Extensibility and elasticity of dough treated with lipoxygenase activity enriched isolate.

| | Force 1 (g) | STDEV 1 (g) | Force 2 (g) | STDEV 2 (g) | Ratio |
|---|---|---|---|---|---|
| Visco-elasticity after 30 min | | | | | |
| 0 units | 47.92 | 1.86 | 29.96 | 1.06 | 0.63 |
| 500 units | 47.4 | 2.57 | 30.1 | 2.06 | 0.64 |
| 1500 units | 56.28 | 4.06 | 32.52 | 3.24 | 0.58 |
| Visco-elasticity after 60 minutes | | | | | |
| 0 units | 48.66 | 3.48 | 31.38 | 2.06 | 0.64 |
| 500 units | 46.3 | 1.94 | 30.06 | 1.53 | 0.65 |
| 1500 units | 60.02 | 3.66 | 37.72 | 2.55 | 0.63 |
| Visco-elasticity after 90 minutes | | | | | |
| 0 units | 49.88 | 2.66 | 30.74 | 2.22 | 0.64 |
| 500 units | 45.96 | 1.47 | 30.48 | 1.37 | 0.66 |
| 1500 units | 61.84 | 3.03 | 38.92 | 2.50 | 0.63 |

The invention claimed is:

1. A Method for preparing food product based on dough comprising a leavening agent, comprising preparing a dough which dough comprises a native potato protein isolate, said native potato protein isolate having a protein content of 90% or more based on dry matter as determined from the weight of total Kjeldahl nitrogen multiplied by 6.25, and wherein said potato protein isolate has different ratios of oxidase and lipase activity obtainable by various forms of processing.

2. The method according to claim 1, wherein said native potato protein isolate has a protein content of 92 wt. % or more based on dry matter.

3. The method according to claim 1, wherein said native potato protein isolate comprises a patatin isolate with lipase activity and oxidase activity.

4. The method according to claim 3, wherein said oxidase activity comprises activity of one or more selected from lipoxygenase, peroxidase, polyphenol oxidase.

5. The method according to claim 3 wherein the ratio between said lipase activity and said oxidase activity is influenced by one or more treatments from the group consisting of using a concentrate of a patatin isolate with 1 to 25 wt. % protein, concentrating the patatin isolate using a 100-300 kDa membrane, or spray drying with air inlet temperatures of 200-250° C., air outlet temperatures of 120-150° C. and a product temperature of 60-90° C.

6. The method according to claim 1, wherein said native potato protein isolate is obtained by applying one or more methods selected from the group consisting of fractionation, ion exchange, gel permeation, ultrafiltration, affinity and mixed-mode chromatography, and fractionation by heat coagulation or acid precipitation.

7. The method according to claim 1, wherein said native potato protein isolate is obtained by a process comprising:
  subjecting potato fruit juice to a flocculation by a divalent metal cation at a pH of 7-9;
  centrifuging the flocculated potato fruit juice, thereby forming a supernatant;

subjecting the supernatant to expanded bed adsorption chromatography operated at a pH of less than 11 and a temperature of 5-35° C. using an adsorbent capable of binding potato protein, thereby adsorbing the native potato protein to the adsorbent; and eluting at least one native potato protein isolate from the adsorbent with an eluent.

8. The method according to claim 7, wherein said eluting is followed by ultrafiltration, such as ultrafiltration using a membrane with a molecular cut-off of 100-300 kDa.

9. The method according to claim 1, wherein the amount of native potato protein isolate in said dough is less than 3 wt. %, based on the total weight of flour in the dough.

10. The method according to claim 1, wherein the amount of native potato protease inhibitor and/or native potato patatin in the dough is less than 1 wt. %, based on the total weight of flour in the dough.

11. A food product based on dough comprising a leavening agent comprising a native potato protein as defined in claim 1.

12. A method of using a native potato protein isolate as an improving agent in food products based on dough comprising a leavening agent, comprising preparing a dough which dough comprises a native potato protein isolate comprising a native potato protein patatin fraction and/or a native potato protein protease inhibitor fraction, said native potato protein isolate having a protein content of 90 wt. % or more based on dry matter as determined from the weight of total Kjeldahl nitrogen multiplied by 6.25.

13. The method according to claim 12, wherein said native potato protein isolate comprises native potato patatin, one or more oxidases, and/or native potato protease inhibitor.

14. A dough comprising a native potato protein isolate comprising a native potato protein patatin fraction and/or a native potato protein protease inhibitor fraction, said native potato protein isolate having a protein content of 90% or more based on dry matter as determined from the weight of total Kjeldahl nitrogen multiplied by 6.25.

15. The method according to claim 1, wherein said native potato protein isolate has a protein content of 95 wt. % or more based on dry matter.

16. The method according to claim 1, wherein said native potato protein isolate has a protein content of 98 wt. % or more based on dry matter.

17. The method according to claim 3 wherein the ratio between said lipase activity and said oxidase activity is influenced by one or more treatments selected from using a concentrate of a patatin isolate with 5 to 20 wt. %, concentrating the patatin isolate using a 100-300 kDa membrane, or spray drying with air inlet temperatures of 200-250° C., air outlet temperatures of 120-150° C. and a product temperature of 60-90° C.

18. The method according to claim 1, wherein the amount of native potato protein isolate in said dough is less then 2 wt. %, based on the total weight of flour in the dough.

19. The method according to claim 1, wherein the amount of native potato protein isolate in said dough is less then 1 wt. %, based on the total weight of flour in the dough.

20. The method according to claim 1, wherein the amount of native potato protease inhibitor and/or native potato patatin in the dough is less than 0.7 wt. %, based on the total weight of flour in the dough.

21. The method according to claim 1, wherein the amount of native potato protease inhibitor and/or native potato patatin in the dough is in the range of 0.1-0.5 wt. %, based on the total weight of flour in the dough.

22. A Method for preparing food product based on dough comprising a leavening agent, comprising preparing a dough which dough comprises a native potato protein isolate comprising a native potato protein protease inhibitor fraction, said native potato protein isolate having a protein content of 90% or more based on dry matter as determined from the weight of total Kjeldahl nitrogen multiplied by 6.25.

23. A Method for preparing food product based on dough comprising a leavening agent, comprising preparing a dough which dough comprises a native potato protein isolate comprising a potato protein lipoxygenase fraction, said native potato protein isolate having a protein content of 90% or more based on dry matter as determined from the weight of total Kjeldahl nitrogen multiplied by 6.25.

24. A Method for preparing food product based on dough comprising a leavening agent, comprising preparing a dough which dough comprises a native potato protein isolate having lipase activity, said native potato protein isolate having a protein content of 90% or more based on dry matter as determined from the weight of total Kjeldahl nitrogen multiplied by 6.25.

* * * * *